(12) United States Patent
Merrick et al.

(10) Patent No.: US 10,377,494 B2
(45) Date of Patent: Aug. 13, 2019

(54) AIRCRAFT DIVIDER ASSEMBLY

(71) Applicant: C&D Zodiac, Inc., Huntington Beach, CA (US)

(72) Inventors: Joseph Merrick, Huntington Beach, CA (US); Ian Geoffrey Scoley, Huntington Beach, CA (US); Eric Heimbach, Huntington Beach, CA (US); Jean-Claude Bourgade, Colomiers (FR); Didier Poho, Colomiers (FR)

(73) Assignee: C&D ZODIAC, INC., Huntington Beach, CA (US)

( * ) Notice: Subject to any disclaimer, the term of this patent is extended or adjusted under 35 U.S.C. 154(b) by 402 days.

(21) Appl. No.: 15/441,051

(22) Filed: Feb. 23, 2017

(65) Prior Publication Data

US 2018/0194471 A1 Jul. 12, 2018

Related U.S. Application Data

(60) Provisional application No. 62/445,650, filed on Jan. 12, 2017.

(51) Int. Cl.
*B64D 11/00* (2006.01)
(52) U.S. Cl.
CPC ................ *B64D 11/0023* (2013.01)
(58) Field of Classification Search
CPC .................................................. B64D 11/0023
See application file for complete search history.

(56) References Cited

U.S. PATENT DOCUMENTS

| 5,024,398 | A | | 6/1991 | Riedinger et al. |
| 5,482,230 | A | * | 1/1996 | Bird .................. B64C 1/10 244/118.5 |
| 5,957,407 | A | | 9/1999 | Auestad |
| 6,152,400 | A | | 11/2000 | Sankrithi et al. |
| 6,676,079 | B2 | | 1/2004 | Takeshima |
| 6,857,598 | B2 | | 2/2005 | Adamson et al. |
| 9,056,681 | B2 | | 6/2015 | Orson et al. |
| 2003/0062449 | A1 | | 4/2003 | Sankrithi |
| 2007/0034742 | A1 | | 2/2007 | Jaeger et al. |
| 2009/0200422 | A1 | | 8/2009 | Johnson |
| 2011/0233333 | A1 | | 9/2011 | Papke |

(Continued)

FOREIGN PATENT DOCUMENTS

| EP | 0629547 A1 | 12/1994 |
| EP | 2686240 | 1/2014 |

(Continued)

OTHER PUBLICATIONS

EP12845224.0 EESR dated Jul. 2, 2015.

(Continued)

*Primary Examiner* — Richard G Davis
(74) *Attorney, Agent, or Firm* — Jeffer Mangels Butler & Mitchell LLP; Brennan C. Swain, Esq.

(57) ABSTRACT

A divider assembly that includes a main body portion having a lower section and an upper section and a removable panel having front and back surfaces. The upper section tapers in width in an upward direction and the main body portion includes front and back surfaces. The removable panel is removably secured to the upper section on the front surface of the main body portion.

14 Claims, 12 Drawing Sheets

(56) References Cited

U.S. PATENT DOCUMENTS

| | | | |
|---|---|---|---|
| 2013/0105627 A1 | 5/2013 | Orson et al. | |
| 2013/0248655 A1* | 9/2013 | Kroll | B64D 11/06 244/118.6 |
| 2013/0321715 A1 | 12/2013 | Millson | |
| 2014/0175219 A1* | 6/2014 | Young | B64D 11/0023 244/118.5 |
| 2015/0284084 A1 | 10/2015 | Mayer | |
| 2016/0304204 A1* | 10/2016 | McKee | B64D 11/003 |
| 2017/0283061 A1* | 10/2017 | Papke | B64D 11/0023 |

FOREIGN PATENT DOCUMENTS

| | | |
|---|---|---|
| WO | 2002028712 | 4/2002 |
| WO | 2013067021 | 5/2013 |

OTHER PUBLICATIONS

PCT/US2012/062815 ISR & Written Opinion dated Feb. 21, 2013.
International Search Report and Written Opinion issued in PCT/US2017/058345.

* cited by examiner

AIRCRAFT DIVIDER ASSEMBLY

This application claims the benefit of U.S. Provisional Application No. 62/445,650, filed Jan. 12, 2017, the entirety of which is incorporated by reference herein.

FIELD OF THE INVENTION

The present invention relates to an aircraft divider assembly, and more particularly to an aircraft class divider that includes a removable panel.

BACKGROUND OF THE INVENTION

In standard aircraft cabin arrangements, the different seating classes are often separated by a class divider. However, to change the appearance of class dividers, typically, the entire divider as to be replaced with a new one. The present invention provides the ability to change portions of the class divider without having to remove the entire assembly.

SUMMARY OF THE PREFERRED EMBODIMENTS

In accordance with a first aspect of the present invention there is provided a divider assembly that includes a main body portion having a lower section and an upper section and a removable panel having front and back surfaces. The upper section tapers in width in an upward direction and the main body portion includes front and back surfaces. The removable panel is removably secured to the upper section on the front surface of the main body portion. In a preferred embodiment, the upper section includes an opening therethrough that is defined by a border portion and the removable panel spans the opening. The back surface of the removable panel is in contact with the border portion.

In a preferred embodiment, the upper section has a narrower thickness dimension than the lower section, and the thickness of the upper section and the removable panel is the same or less than the thickness of the lower section. Preferably, a ledge is defined on the front surface of the main body portion by the thicker lower section. In a preferred embodiment, a gap is defined between a bottom surface of the removable panel and the ledge. Preferably, a removable cover strip is positioned to cover the gap. In a preferred embodiment, a bottom portion of the removable panel is removably secured to the upper section by fastening means. Preferably, the cover strip is positioned using a French cleat. In a preferred embodiment, the cover strip includes a hook portion that is engaged with the top of the French cleat. Preferably, a lighted panel is positioned behind the cover strip.

In a preferred embodiment, a channel is defined at least partially around the upper section. The channel receives at least a portion of the outer edge of the removable panel. Preferably, the upper section further includes a trim extending at least partially therearound. The trim defines the channel that receives the outer edge of the removable panel. In a preferred embodiment, the divider assembly further includes at least one of a literature pocket module, in-flight entertainment module, cup holder module, coat hook module, tablet holder module or panel module removably secured to the back surface of the main body portion.

In one embodiment, the present invention is an aircraft partition that includes a removable or changeable upper panel. The main body portion of the partition includes a trim that extends around the edges and that is preferably made of aluminum or other metal. In another embodiment, the trim can be made of plastic or the like. The aluminum profile wraps around the whole perimeter of the panel and has a U-shape that captures the top and side edges of the upper panel. Preferably, the partition is tapered towards the top (i.e., it is wider at the bottom than it is at the top when viewed from a fore or aft position in an aircraft). Therefore, by sliding the panel down a predetermined distance (e.g., one inch), it clears the trim on either side and can be removed. The partition also includes fixings along the bottom of the panel to stop the panel from dropping down during regular use. Generally, the panel has a mechanical fixing at the bottom thereof to hold it in position, but it is supported structurally around its perimeter edge (top and side edges) by the U-shaped aluminum extrusion or trim.

It will be appreciated that, the panel is essentially a wedge that is being slid up into the space or channel created by the trim. In a preferred embodiment, by having the top panel crushed or made to a thinner dimension than the lower section or panel, the smaller dimension panel (e.g., eighth of an inch) can be used to bring the whole panel back up to an inch again so that it is a generally constant thickness all the way through.

In a preferred embodiment, a trim or narrow panel covers the gap between the upper panel and the lower section or panel. This gap is provided to allow the upper panel to move or slide downwardly so that it clears the trim and can be removed. In preferred embodiment, the narrow upper panel is secured in place by a French cleat, which has a ledge across its top edge and then has fixings at the bottom (e.g., threaded fasteners, Velcro, screws, slide fittings or the like to lock it in place).

In use, the present invention provides airlines or other users with the ability to quickly and easily reconfigure cabin décor panels on aircraft partitions. Generally, the system uses crushed panel technology in combination with a capturing edge trim frame that allows a décor panel (upper panel or section) to be slid into position and secured or locked with mechanical fasteners. In another embodiment, panels or sections on other cabin vertical surfaces (e.g., galleys, stowages and lavatories) can be changeable using the system described herein. The divider assembly can be a full height partition or less than full height.

In a preferred embodiment, the bottom portion and the upper portion comprise honeycomb panels (or a single honeycomb panel) and the upper section (or removable panel) is removable therefrom. In a preferred embodiment, the upper panel has a thinner dimension than the lower section. This allows the removable panel to bring the overall dimension of the upper portion of the partition to be about the same as the lower section. Therefore, the upper portion is also referred to herein as the indented portion.

The removable panel can be an opaque panel that can include branding thereon or a direct view panel, which is transparent or see-through. Preferably, the divider assembly includes an outer trim or rim that is U-shaped and retains the removable panel on the top and sides of the removable panel and a forward facing trim or cover panel that conceals the bottom edge of the removable panel and the gap between the removable panel and a lower portion.

In a preferred embodiment, the divider assembly (specifically, the upper portion) includes an opening defined therethrough so that a passenger can see through the partition when a direct view panel is used. In another embodiment, the opening can be omitted. The trim defines a channel that captures or retains the top and side edges of the removable panel. In a preferred embodiment, the divider assembly includes means for attaching the cover panel to the upper portion. In the embodiment shown in the drawings, the attachment means is a French cleat that is secured to the main body portion by threaded fasteners or the like. The French cleat is used to locate and support the cover panel. The cover panel overlaps the entire strip of the French cleat for location and support and is then secured in place with mechanical fasteners. The French cleat can have Velcro, adhesive, tape, glue or the like on the front surface thereof so that the cover panel can be attached thereto. In another embodiment, the French cleat can be omitted and the cover panel can be directly connected to the upper portion.

The removable panel is secured at the bottom thereof to the indented portion. This can be done by threaded fasteners, such as screws, by snaps, buttons, Velcro or other securing device that allows the removable panel to be unattached to the upper portion. In the example shown in the drawings, the removable panel and the upper portion include openings therein for receiving threaded fasteners.

In a preferred embodiment, the divider assembly includes branding associated with the cover panel. As shown in the figures, a lighted element that says "ecos" is secured to the main body portion. The cover panel includes "ecos" thereon that can be back lit by the lighted element. "Ecos" is only exemplary. Any logo, word, picture, inscription can be included. The removable panel can include a cutout therein for routing the wiring associated with the lighted element.

The steps for removing the removable panel from the divider assembly 10 are discussed below. It will be appreciated that these steps are reversed to place the new removable panel in position. Step one includes removing the cover panel from the divider assembly. There is a gap between the bottom edge of the removable panel and the top edge of the lower portion. This gap allows the removable panel to move downwardly. Next, the bottom of the removable panel is unattached to the indented portion. In an exemplary embodiment, this is done by removing the threaded fasteners. Step two includes lowering the removable panel (and closing the gap) until the bottom edge of the removable panel contacts the top edge of the lower portion. In another embodiment, the removable panel can just be lowered without having to contact the top edge of the lower section. When the removable panel is lowered enough that it traverses the, the side and upper edges of the upper panel are removed from or come out of the channel in the trim. This is made possible by the tapered shape of the top portion of the divider assembly.

Step three includes continuing to lower the removable panel by pulling forward and slightly away from the lower section so that the bottom edge of the removable panel clears the top edge of the lower section. Next, the removable panel can be removed and is now completely free of the partition.

In another embodiment, includes the main body portion of the divider assembly includes a downwardly extending foot that attaches to the seat tracks in the floor of the cabin. Preferably, the foot spaces the bottom of the main body portion from the floor to provide room for passengers' feet. Preferably, the main body portion also includes an upwardly extending connector for connecting to the ceiling or wall of the cabin. A connector can also extend from the side of the main body portion.

In a preferred embodiment, the divider assembly can include outlets or ports (e.g., USB) for providing electrical and/or data communication with personal devices, such as tablets, phones or other computer devices. In an embodiment, the upper panel can include LED lighting therearound or therein to emphasize any branding thereon.

In a preferred embodiment, the partition is customizable and modular. Customizable means that the partition can be customized depending on the customer's (e.g., airline's) desires. Also, it is preferably modular, meaning that the cover panels can be changed or switched out when they are worn out, dirty or to update the look of the aircraft. Different materials or looks or branding can be included on the different cover panels. Airlines are then able to change the cabin atmosphere without changing the entire divider assembly. Therefore, it should be understood that the partition shown in the attached drawings and described herein is only exemplary and that many changes and customizations can be made to the invention.

In another embodiment, TV screens can be built into or attached to the partition. In an embodiment, the removable cover panel or module on at least one of the sections (e.g., the lower section) can include literature pockets thereon. The modules can include a literature pocket module, a passenger accessories module (e.g., phone, USB, tablet holder), a crew accessories module or an in-flight entertainment module, etc.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
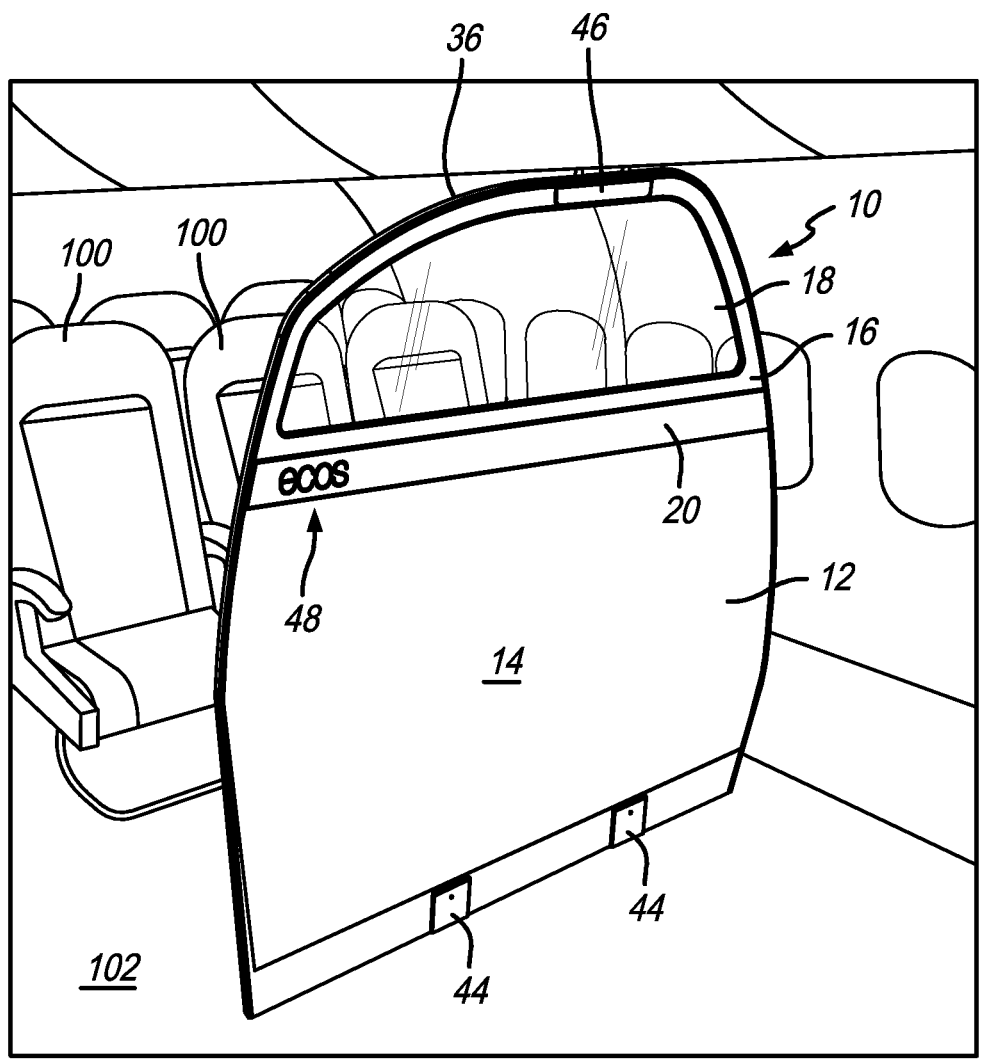
FIG. 1 is a perspective view of a divider assembly position in an aircraft cabin in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the attached drawings show an aircraft partition or divider assembly 10. The divider assembly 10 is positionable between rows of seats 100 or other components (lavatories, closets, galleys, etc.) in an aircraft cabin 102 to divide sections or classes of the aircraft. For example, the divider assembly 10 can be positioned or mounted between first and coach classes.

FIG. 1 shows the divider assembly 10 mounted in the interior of an aircraft. In a preferred embodiment, the divider assembly 10 generally includes a main body portion 12 having front and back surfaces 12a and 12b, a lower section 14 and an upper section 16. In a preferred embodiment, the upper section 16 tapers in width in an upward direction (towards the ceiling of the aircraft). In other words, as shown in FIG. 2, the upper section 16 defines a bottom width W1 and a top width W2 and the top width W2 is narrower than the bottom width W1.

Figure 2:
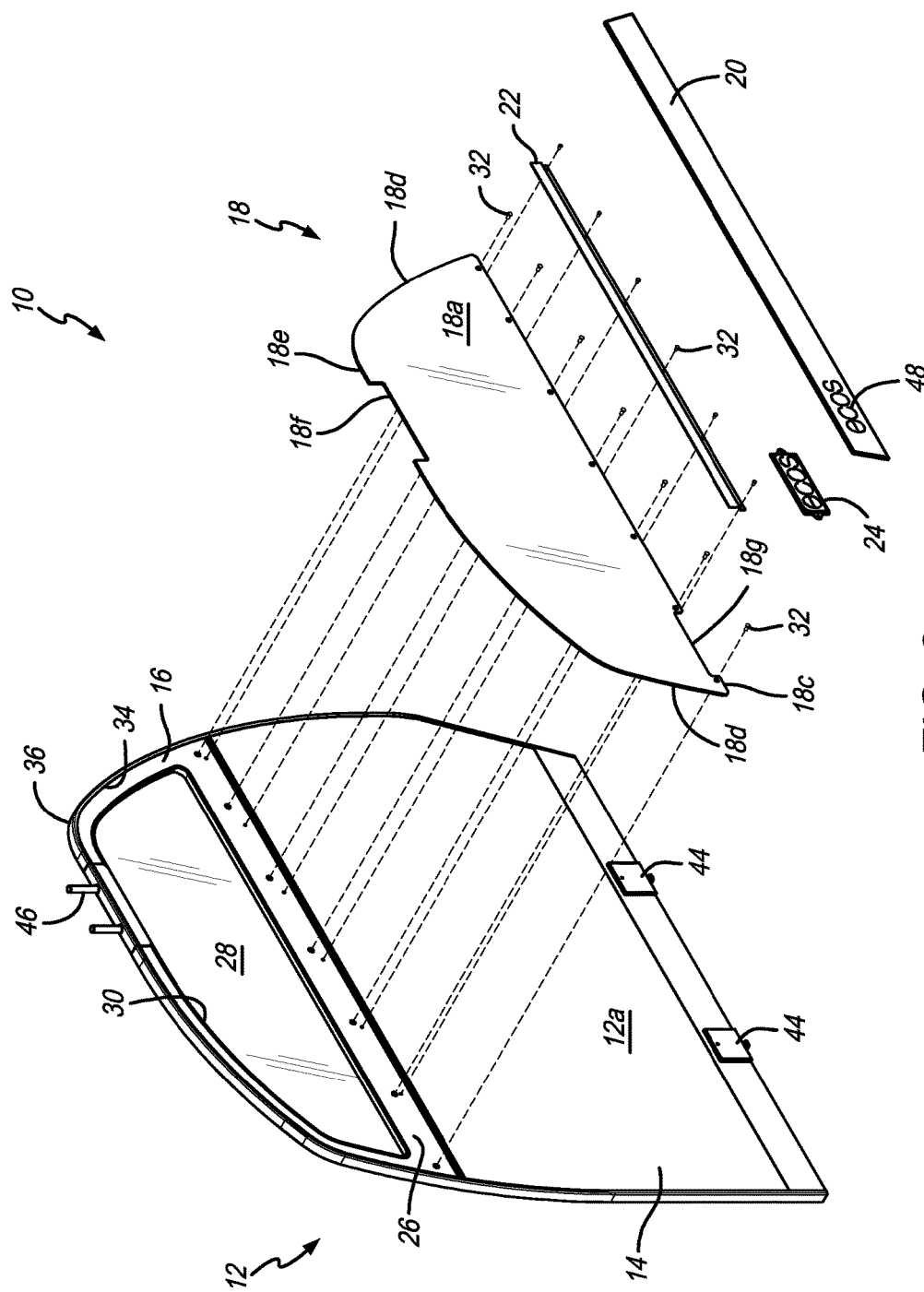
FIG. 2 is an exploded perspective view of the divider assembly of FIG. 1.

As shown in FIG. 2, the divider assembly 10 generally includes the main body portion 12, a removable panel 18 having front and back surfaces 18a and 18b, a cover strip 20, a French cleat 22 and a light assembly or lighted panel 24. In a preferred embodiment, the removable panel 18 is removably secured to the upper section 16 on the front surface 12a of the main body portion 12. In other embodiments, the removable panel can be secured to the back surface 12b of the main body portion 12 or to either side of the lower section.

With reference to FIGS. 2-4D, in a preferred embodiment, the upper section 16 has a narrower thickness dimension than the lower section 14. This allows the removable panel 18 to be secured to the upper section 16 without increasing the overall thickness of the main body portion 12. Preferably, the thickness of the upper section 16 and the removable panel 18 together is the same or less than the thickness of the lower section 14. Because of the thickness difference, the upper section is also referred to herein as the indented section or portion. Also, because of the thickness difference, a ledge 26 is defined on the front surface 12a of the main body portion 12 by the thicker lower section 14. The ledge 26 spans the width of the main body portion 12. In another embodiment, the ledge may only span a portion of the width of the main body portion 12.

It will be appreciated that the removable panel 18 can be opaque or transparent/see-through. In a preferred embodiment, the upper section 16 includes an opening 28 therethrough that is defined by a border portion 30. A frame 31 can also be included to help define opening 28 and for aesthetic purposes. The border portion 30 is essentially the solid portion of the upper section 16. The removable panel 18 spans the opening 28 and the back surface 18b of the removable panel 18 is secured against or in contact with the border portion 30.

Figure 4:
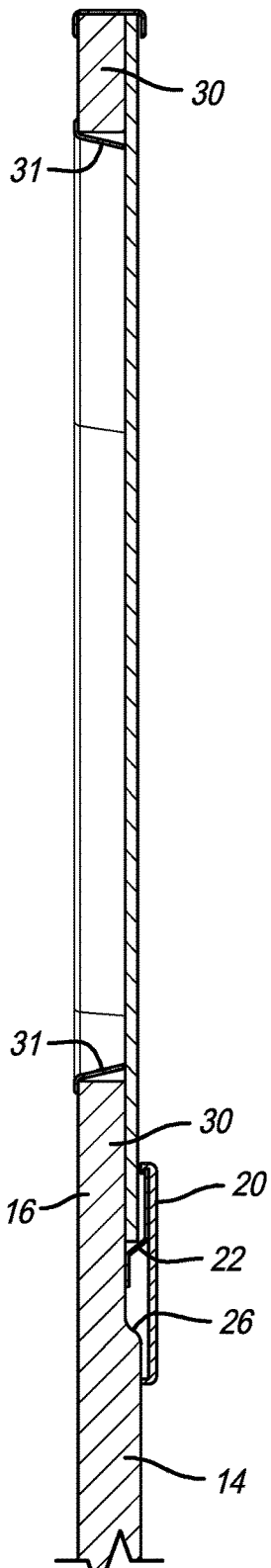
FIG. 4 is a cross-sectional view of the divider assembly of FIG. 1.
Figure 4A:
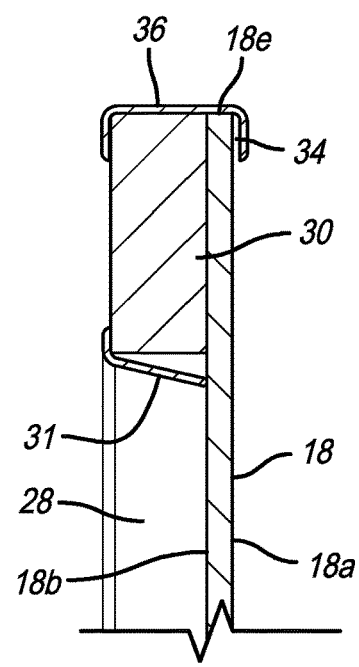
FIG. 4A is a cross-sectional view of a portion of FIG. 4.
Figure 4B:
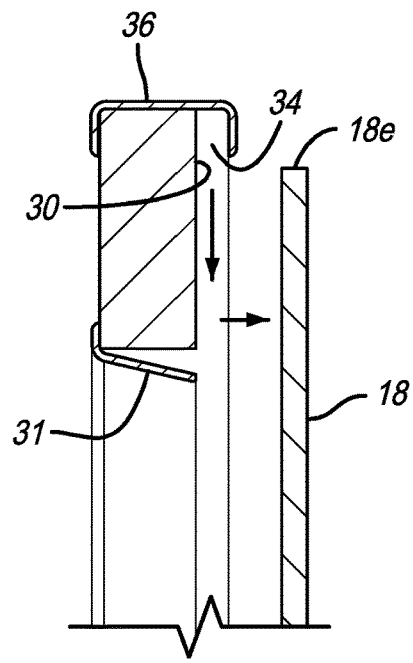
FIG. 4B is a cross-sectional view similar to FIG. 4A, but with the panel exploded therefrom.

As shown in FIG. 2, in a preferred embodiment, the bottom portion of the removable panel 18 is removably secured to the upper section by fastening means. Any method for securing the removable panel 18 to the upper section 16 (or any section of the main body portion 12) is within the scope of the present invention. In a preferred embodiment, threaded fasteners 32 are secured through holes in the removable panel 18 and are threaded into holes in the main body portion 12. However, in other embodiments, the fastening means can be non-threaded fasteners, rivets, adhesive, glue, tape, welding or the like. It will be appreciated that the fastening means can also be used to secure the sides and/or the top of the removable panel 18. However, in a preferred embodiment, as shown in FIGS. 2 and 4A-4B, the side and top edges 18d and 18e of the removable panel 18 are received in and secured by a channel 34 that is defined by trim 36 that extends around the outside of the upper section 16 or the entire main body portion 12. Channel 34 can be defined by components other than trim. For example, the channel can be defined directly in the main body portion 12 or include a component inboard of the trim.

Figure 4C:
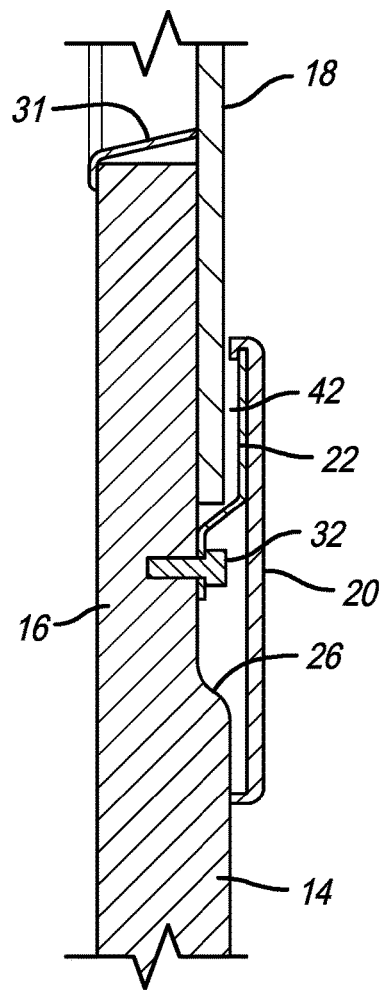
FIG. 4C is a cross-sectional view of another portion of FIG. 4.
Figure 4D:
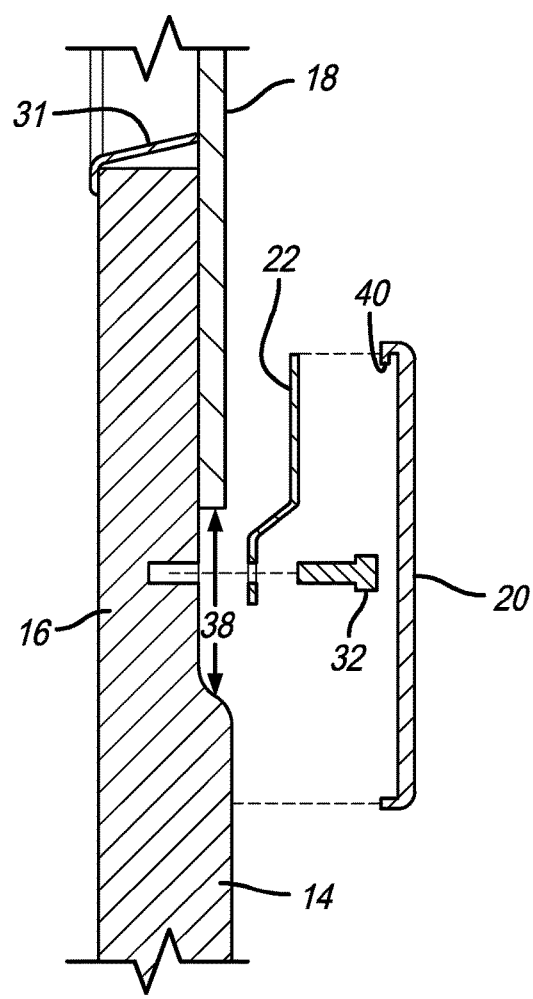
FIG. 4D is a cross-sectional view similar to FIG. 4C, but with some components exploded therefrom.

As is best shown in FIG. 4D, a gap 38 is defined between the bottom edge 18c of the removable panel and the ledge 26. This gap 38 allows the removable panel 18 to move downwardly when being removed, as further described below. In a preferred embodiment, the cover strip 20 is positioned to cover the gap 38 (and the threaded fasteners 32). As shown in the figures, the cover strip 20 is secured in place by the French cleat 22. The French cleat 22 is secured to the main body portion 12 and/or the upper section 16 by fasteners, threaded fasteners, adhesive, glue, tape, welding, quick release fasteners, spring biased clips or other attachment method. The cover strip 20 is secured to the front surface of the French cleat 22 by the Velcro, tape, adhesive, threaded fasteners or the like. As shown in FIGS. 4C and 4D, the cover strip 20 can also include a hook portion 40 on the top thereof that hooks over the top edge of the French cleat 22 to help secure the cover strip 20 in place. In another embodiment, the French cleat can be omitted and the cover strip 20 can be directly connected to the main body portion 12 and/or the upper section 16 or the removable panel 18. The French cleat 22 can also be used to hold or secure the bottom of the removable panel 18. As shown in FIG. 4C, the French cleat defines a trough 42 that receives the bottom portion of the removable panel 18.

In another embodiment, the French cleat 22 can be omitted, the threaded fasteners 32 securing the bottom of the removable panel 18 can be omitted, and the cover strip 20 can be used to secure the bottom of the removable panel 18 in place. In this embodiment, once the cover strip 20 is removed the removable panel 18 is free to move downwardly so that it can be removed from the main body portion 12 and/or the upper section 16.

Figure 3:
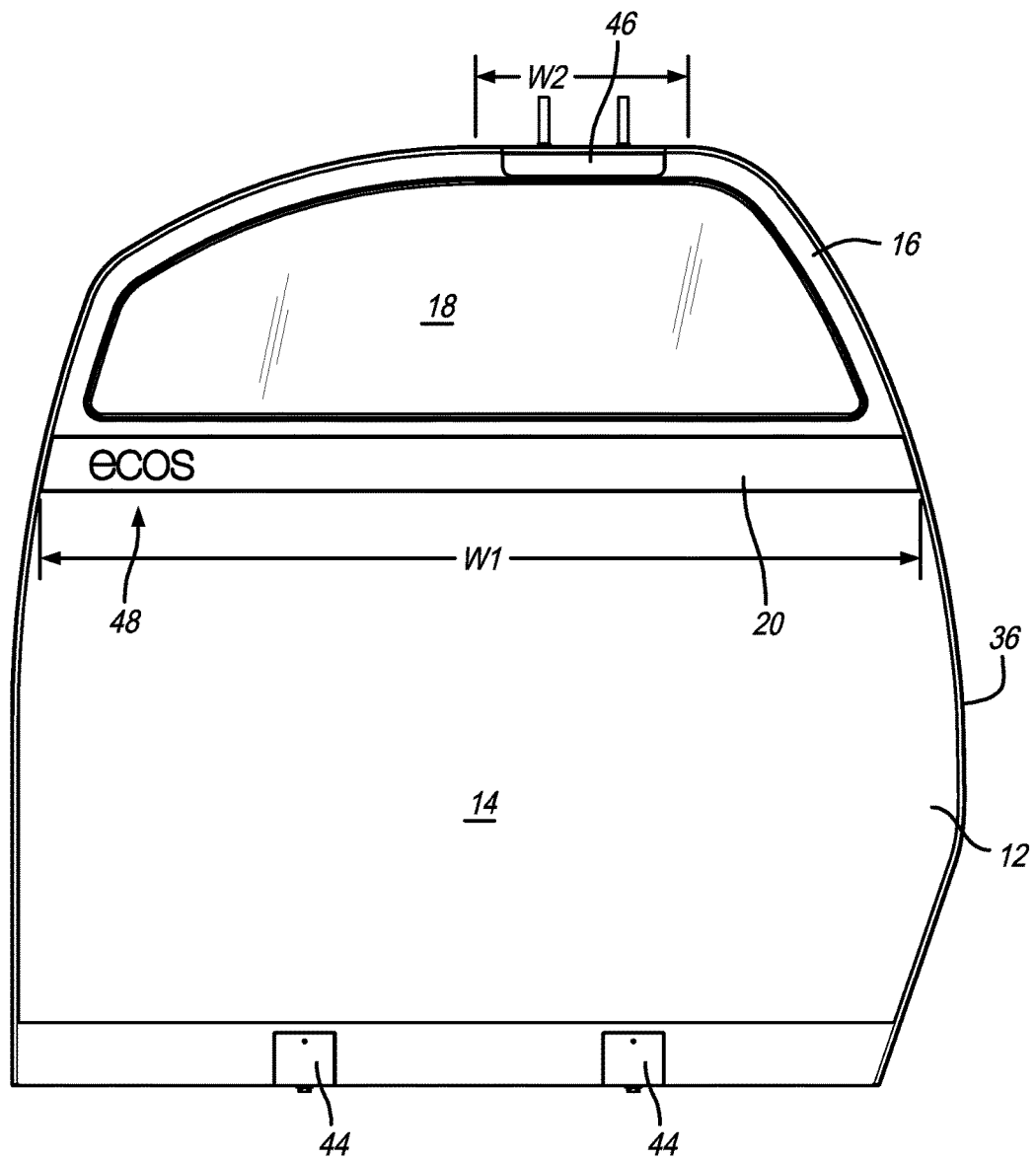
FIG. 3 is a front elevational view of the divider assembly of FIG. 1.

In a preferred embodiment, the divider assembly 10 includes upper and lower attachment portions 44 and 46 for securing the divider assembly 10 to the floor of the aircraft cabin and/or the ceiling or any component above the main body portion 10. As shown in FIGS. 1-3, the lower attachment portions 44 can be spaced such that they attached to the seat attachment tracks on the floor of the aircraft cabin 102 and the upper attachment portion 46 can include posts that extend upwardly and attached to the personal service unit rails associated with the overhead storage bins. The removable panel 18 can include a cutout 18f defined therein that surrounds or makes room for the upper attachment portion 46.

In a preferred embodiment, the divider somewhere 10 includes the lighted panel 24 positioned behind the cover strip 20. Preferably, the cover strip 20 includes inscribed writing, a transparent portion or other indicia 48 that is backlit by the lighted panel 24. The removable panel 18 can include a cutout 18g therein that receives the lighted panel 24 and allows wiring to be routed therethrough. The lighted panel 24 and indicia 48 on the cover strip 20 can be used for advertising purposes.

Figure 5A:
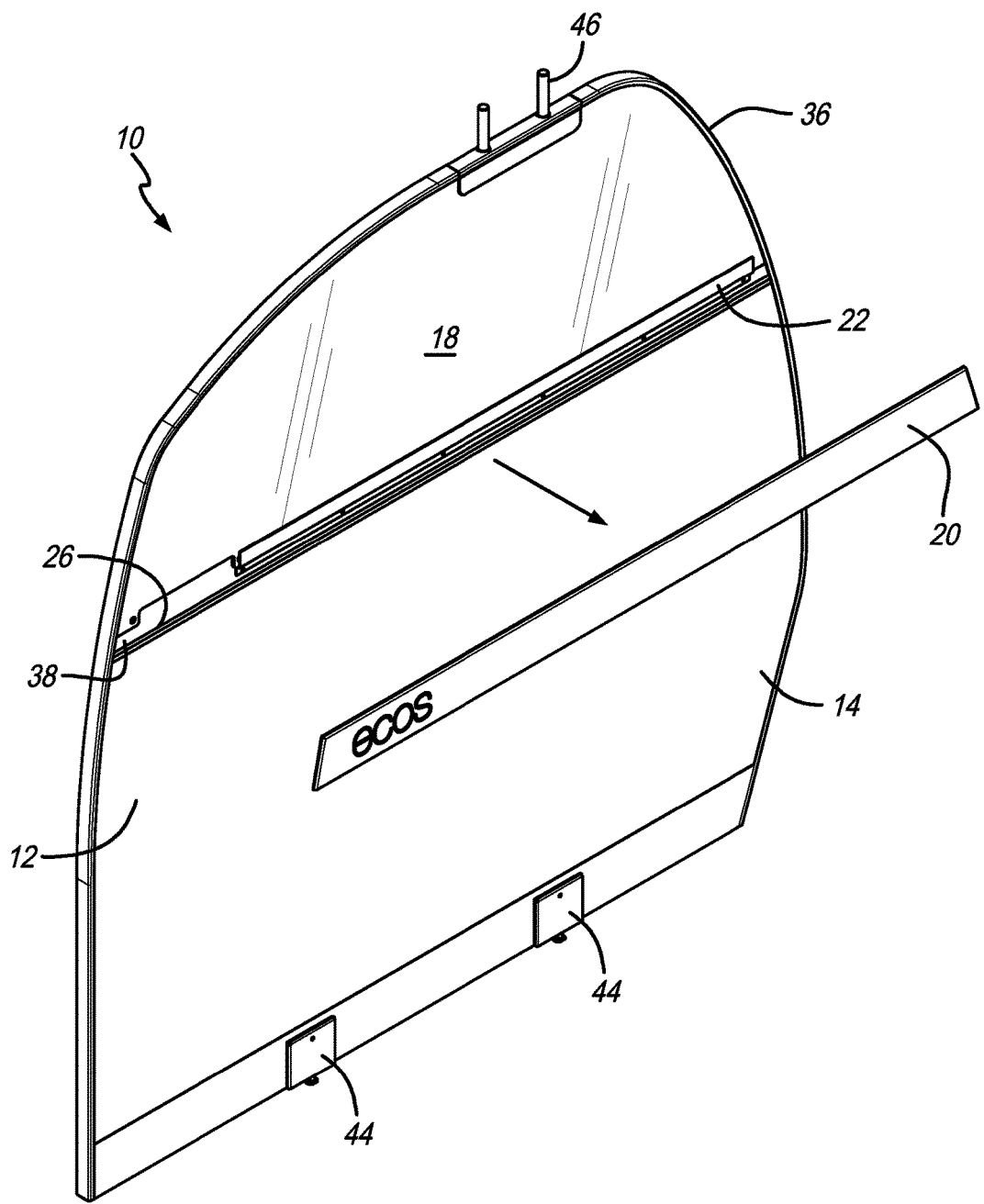
FIGS. 5A-5E are a series of perspective views showing exemplary steps for removing the panel from the divider assembly.
Figure 5B:
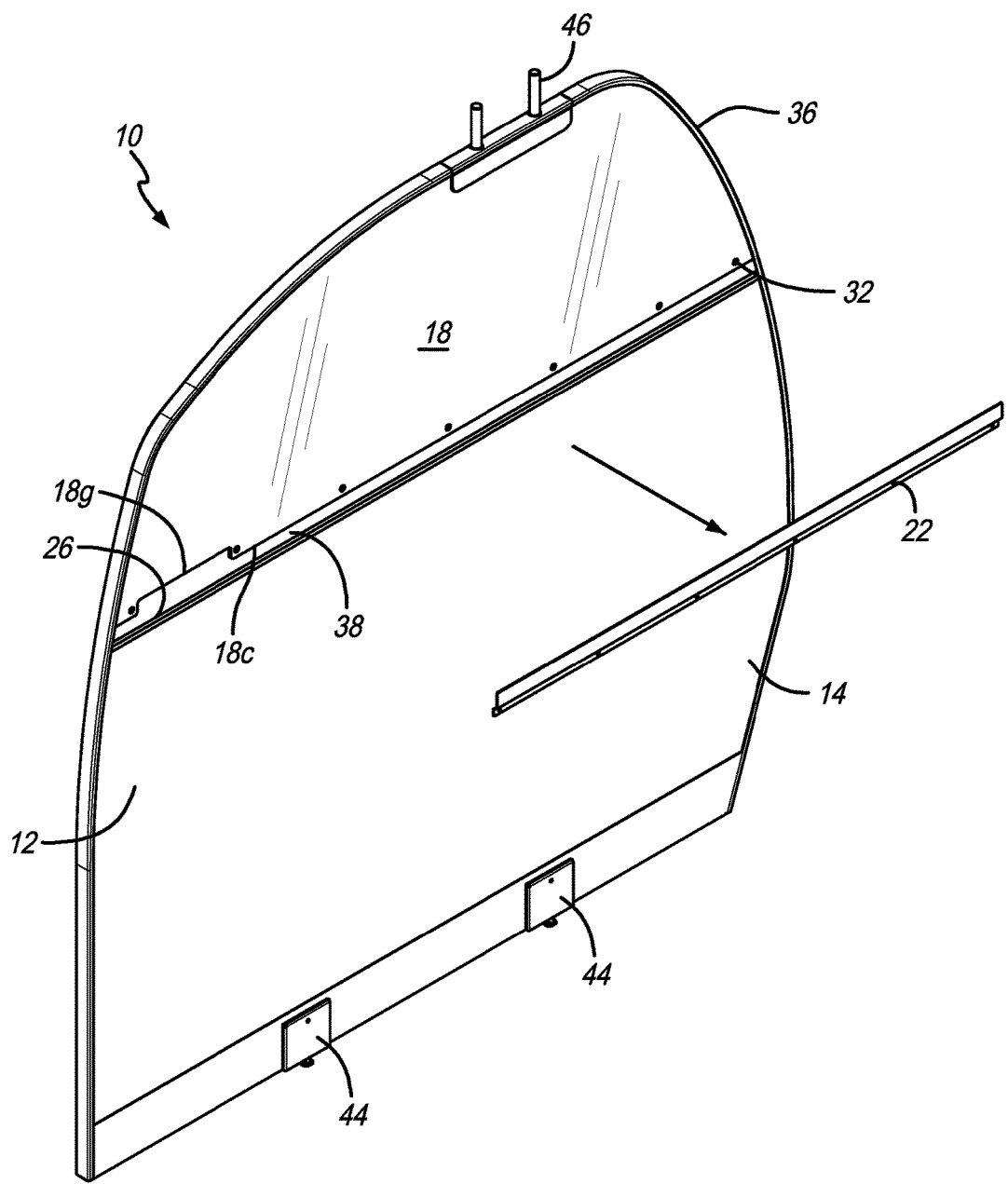
Figure 5C:
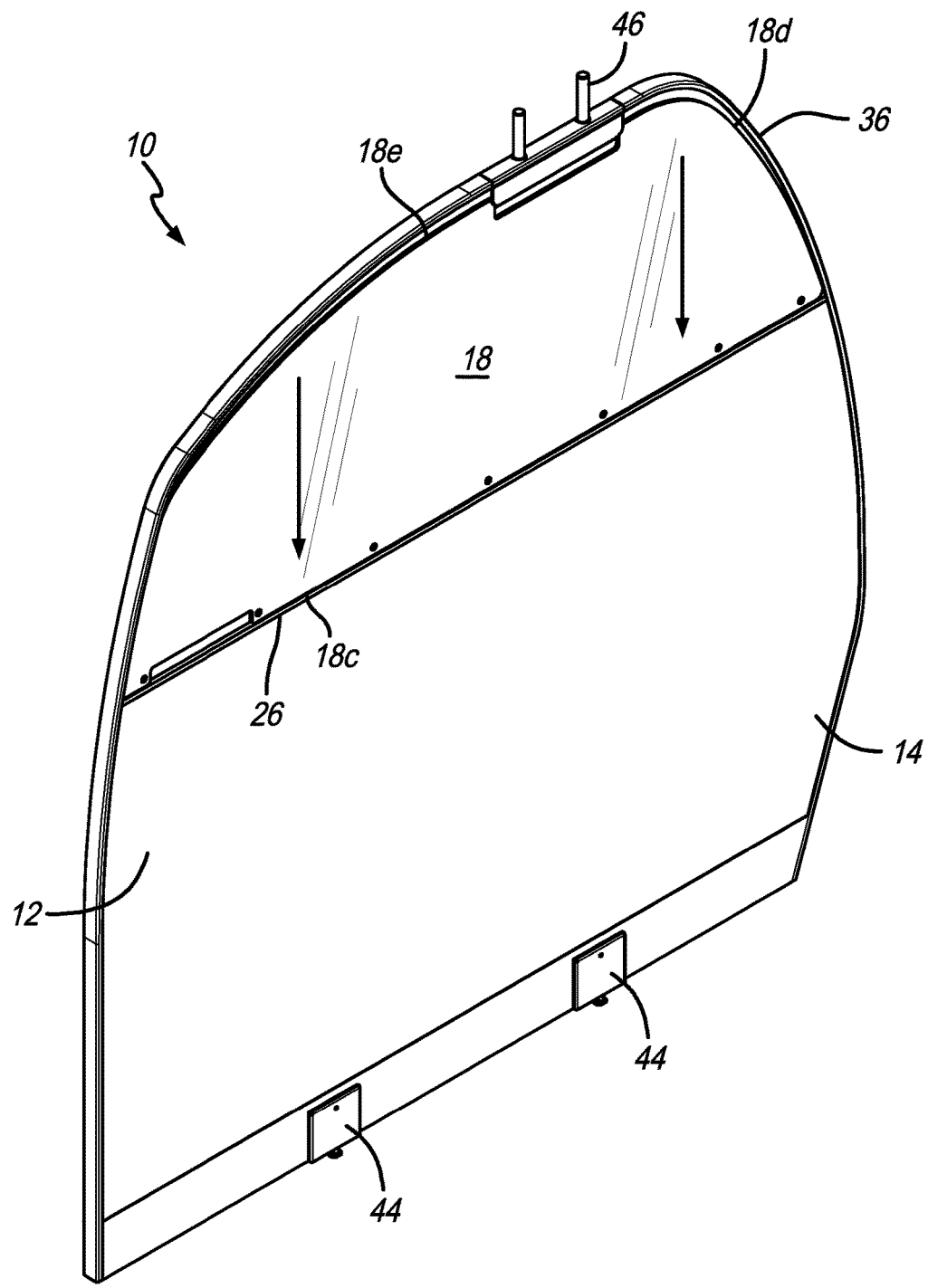
Figure 5D:
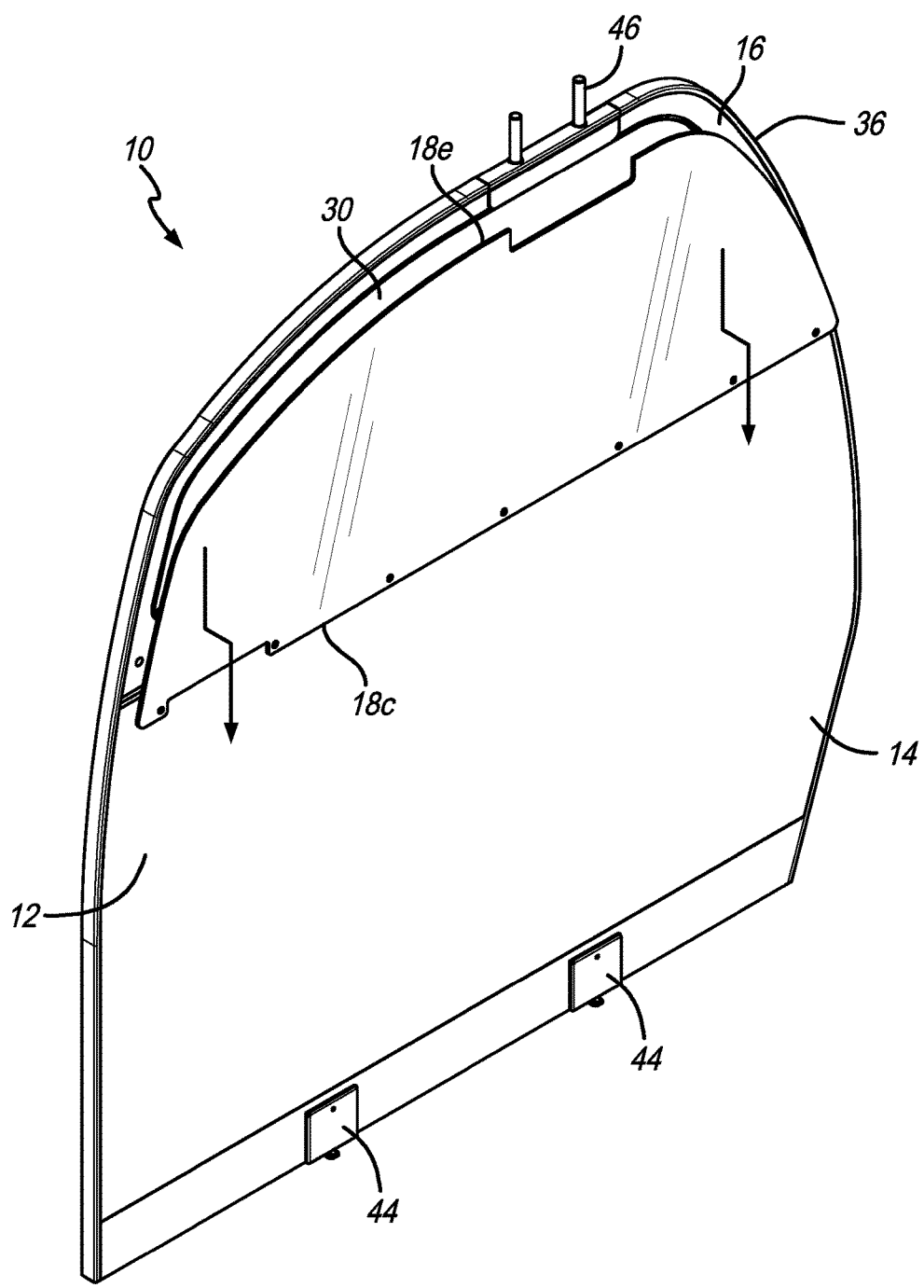
Figure 5E:
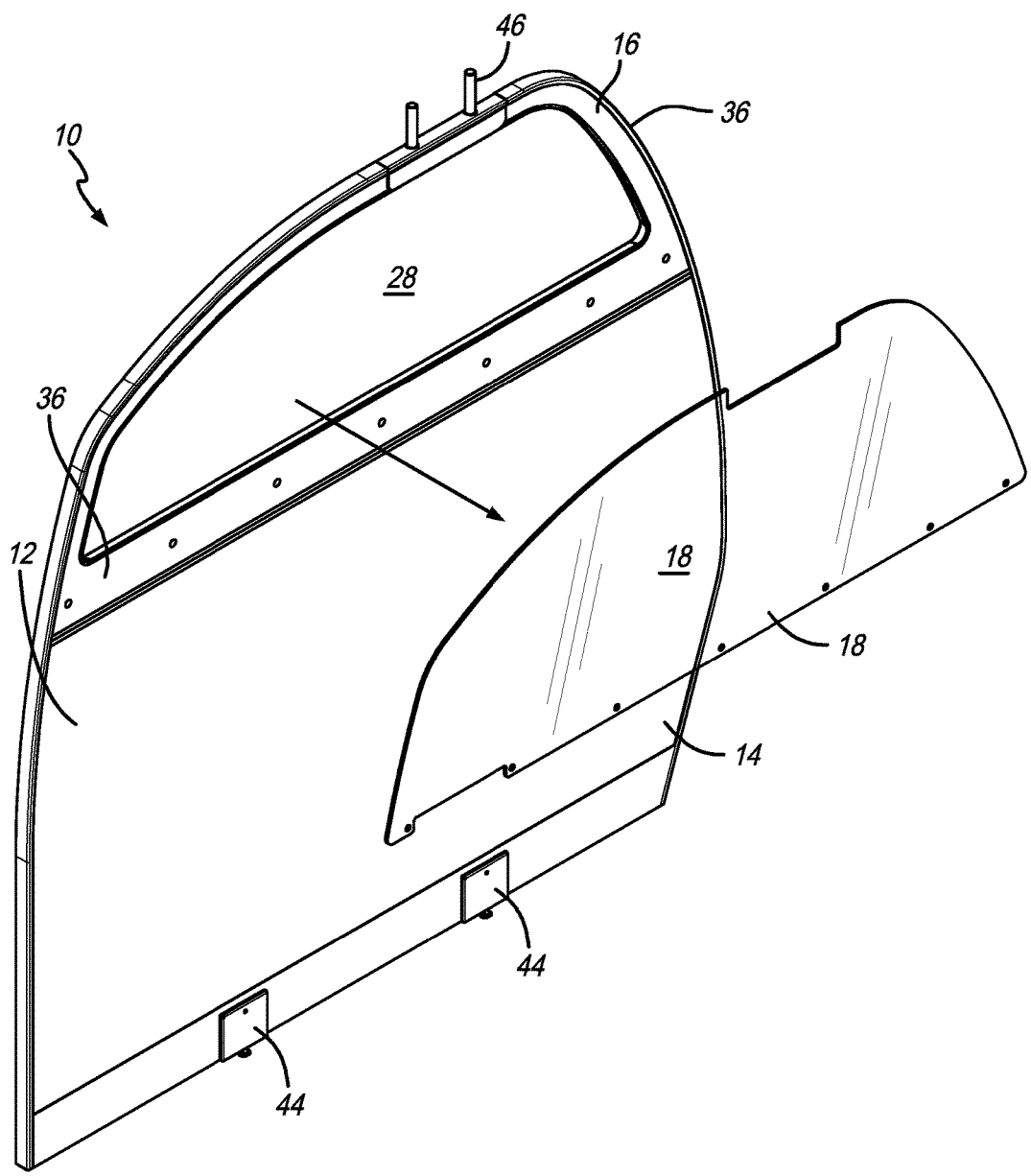

FIGS. 5A-5E show exemplary steps for the removal of removable panel 18 from the divider assembly 10. First, as shown in FIG. 5A, the cover strip 20 is removed from the French cleat 22 (or main body portion 12 if it is connected directly thereto). Next, as shown in FIG. 5B, the French cleat 22 is removed from the main body portion 12. Next, as shown in FIG. 5C, the removable panel 18 is moved downwardly, thereby closing the gap 38, until the bottom edge 18c is close to or in contact with ledge 26. When this happens the side and top edges of the removable panel 18 move partially or all the way out of the channel 34. Next, as shown in FIG. 5D, the bottom of the removable panel 18 is pulled outwardly so that it clears the ledge 28 and the entire removable panel 18 is moved downwardly so that the side and top edges of the removable panel 18 clear the channel. Next, as shown in FIG. 5E, the removable panel 18 is removed from the main body portion 12 of the divider assembly 10. It will be appreciated that these steps can be changed. For example, in an embodiment where the cover strip holds the bottom of the removable panel in place, the step shown in FIG. 5B can be omitted.

Figure 6:
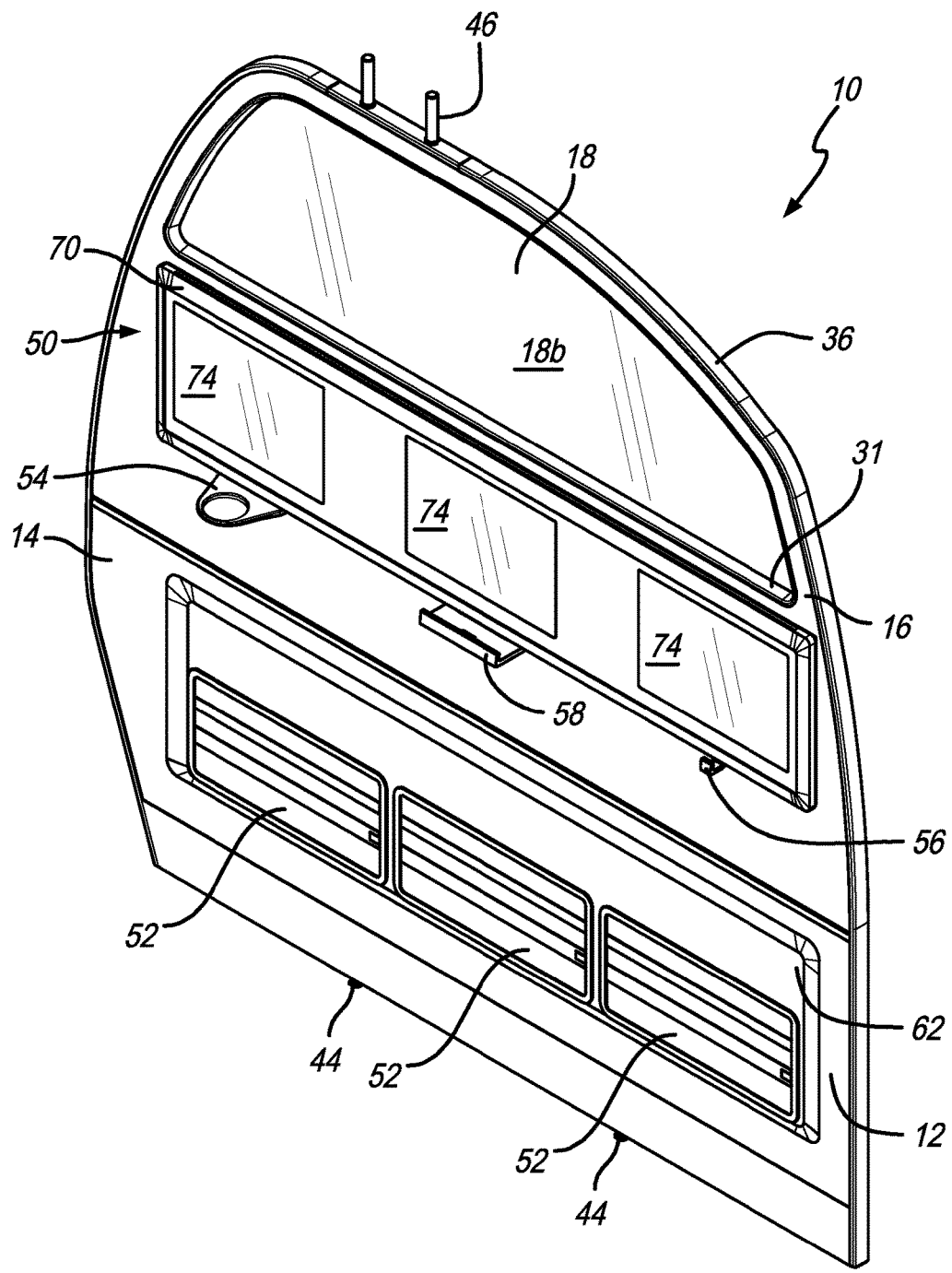
FIG. 6 is a perspective view of the aft side of the divider assembly.
Figure 7:
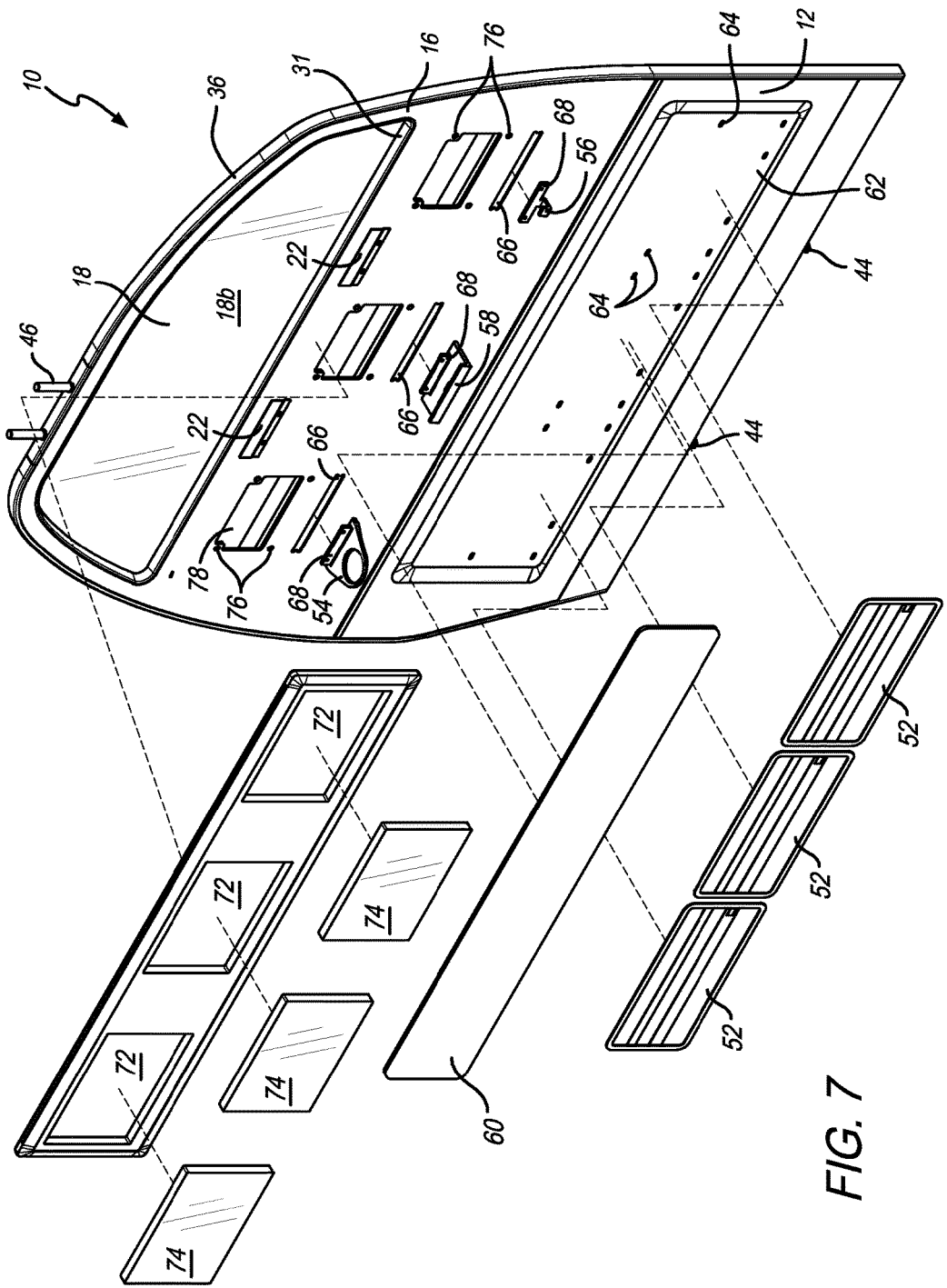
FIG. 7 is an exploded perspective view of the aft side of the divider assembly.

FIGS. 6-7 show an embodiment of the divider assembly 10 that includes modules on the back or aft side. It will be appreciated that the modules described herein are optional. In another embodiment, the divider assembly can include the modules and no removable panel. FIGS. 6 and 7 show an inflight-entertainment ("IFE") module 50 a plurality of literature pocket modules 52, a cup holder module 54, a coat hook module 56, a tablet holder module 58, and a panel module 60 (only shown in FIG. 7). It will be appreciated that the term module is used herein to indicate that the modules can be removed and replaced with different or other modules. The various modules can be used by occupants of the seats on the back or aft side of the divider assembly 10.

In a preferred embodiment, each of the literature pocket modules 52 can be removed separately. In another embodiment, the literature pocket modules 52 can be part of a single panel and removed together. Preferably, the main body portion 12 includes a crush or indentation 62 therein (or a separate indentation for each module). Male connectors are attached to the back of the literature pocket modules 52 and mate with openings 64 in positioned in the indentation 62. The embodiment shown in the drawings includes three openings on the right and three opening on the left for each literature pocket module 52. In another embodiment, the male connectors can be positioned in the indentation and the openings can be in the back of the modules. Any connection methodology is within the scope of the present invention. For example, the connection can be made via mechanical fixings, press stubs, snap fit, friction fit, threaded fasteners, Velcro, adhesives, quick release fasteners, etc. Any of the modules discussed herein can be secured in place using any of the described attachment methods or others known to those of skill in the art.

The literature pocket modules 52 can be replaced with other modules. For example, as shown in FIG. 7, a panel module 60 (e.g., aesthetically pleasing wood paneling) can take the place of the literature pocket modules 52 if the divider assembly 10 is moved to a position where literature pockets are unnecessary.

The cup holder module 54, coat hook module 56 and tablet holder module 58 can be disposed in openings 66 defined in the main body portion 12 and secured in place with threaded fasteners or the like. In another preferred embodiment, the cup holder module 54, coat hook module 56 and tablet holder module 58 can be disposed at the bottom of the IFE panel 50 and secured in place with mechanical fasteners or the like (to the IFE panel or the main body portion 12). Each of these modules can include a flange 68 for alignment and attachment purposes. The tablet holder module 58 can include a port (e.g., a USB port) therein. The modules can be permanently attached to the main body portion 12 or can be removable. In another embodiment, the cup holder module 54, coat hook module 56 and tablet holder module 58 or any combination thereof (e.g., three cup holders for the three passengers) can be mounted or part of an accessories rail that spans most of the main body portion 12. The accessories rail can be secured to the main body portion or be attached to the IFE module (e.g., the backplate 70). Also, the individual modules 54, 56 and 58 can be secured to the IFE module, the main body portion 12, the monitor frame 50, the rail or the branding strip 20.

In a preferred embodiment, the IFE module 50 includes a frame or backplate 70 having three monitor openings 72 defined therein for receiving monitors 74 (e.g., a honeycomb panel with three openings defined therein). In addition to the backplate, the IFE module 50 includes a frame including two end caps one at the left and one at the right and two extrusions one at the top and one at the bottom. The bottom extrusion of the backplate 70 can be used as the accessories rail. In other words, in a preferred embodiment, the individual modules 54, 56 and 58 are be secured to the back of the backplate or frame 70. Preferably, indentations or the like are defined in the back of the frame 70 and the flanges 68 of the modules 54, 56 and/or 58 are received in the indentations and attached to the back of the frame. The backplate 70 can be connected to the main body portion 12 by any attachment method described herein. In a preferred embodiment, it is secured by one or more French cleats 22. The monitors 74 can be secured to the backplate 70 or secured directly to the main body portion 12 (see openings 76). Wire openings 78 can also be included in the main body portion 12 for routing of wires to the monitors 74.

The accessories (54, 56 and 58) can be permanent or interchangeable. Their position on the rail can be adjustable. Furthermore, it should be understood that the accessories are not limited to cup/shelf/hook, but can include any mix of accessories. In an embodiment, any one or all of the accessories can be foldable or hingeable. The monitor panel 50 can be modular in construction, have a configurable width (to fit different panels) and/or can be monitor configurable (CNC hole size and position).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A divider assembly comprising:
    a main body portion that includes a lower section and an upper section, wherein the upper section tapers in width in an upward direction, wherein the main body portion includes front and back surfaces, wherein the upper section has a narrower thickness dimension than the lower section, and wherein the thickness of the upper section and the removable panel is the same or less than the thickness of the lower section, and
    a removable panel having front and back surfaces, wherein the removable panel is removably secured to the upper section on the front surface of the main body portion.

2. The divider assembly of claim 1 wherein the upper section includes an opening therethrough that is defined by a border portion, and wherein the removable panel spans the opening and the back surface of the removable panel is in contact with the border portion.

3. The divider assembly of claim 1 wherein a ledge is defined on the front surface of the main body portion by the thicker lower section.

4. The divider assembly of claim 3 wherein a gap is defined between a bottom surface of the removable panel and the ledge.

5. The divider assembly of claim 4 wherein a cover strip is positioned to cover the gap.

6. The divider assembly of claim 1 wherein a bottom portion of the removable panel is removably secured to the upper section by fastening means.

7. The divider assembly of claim 1 wherein a channel is defined at least partially around the upper section, wherein the channel receives at least a portion of the outer edge of the removable panel.

8. The divider assembly of claim 7 wherein the upper section further includes a trim extending at least partially therearound, wherein the trim defines the channel.

9. The divider assembly of claim 1 wherein a cover strip is positioned to cover the bottom of the removable panel.

10. The divider assembly of claim 9 wherein a lighted panel is positioned behind the cover strip.

11. The divider assembly of claim 1 further comprising at least one of a literature pocket module, in-flight entertainment module, cup holder module, coat hook module, tablet holder module or panel module.

12. The divider assembly of claim 1 further comprising an in-flight entertainment module, wherein at least one of a cup holder module, coat hook module or tablet module is connected to the in-flight entertainment module.

13. A divider assembly comprising:
    a main body portion that includes a lower section and an upper section, wherein the upper section tapers in width in an upward direction, wherein the main body portion includes front and back surfaces,
    a removable panel having front and back surfaces, wherein the removable panel is removably secured to the upper section on the front surface of the main body portion, and
    wherein a cover strip is positioned to cover the bottom of the removable panel using a French cleat.

14. The divider assembly of claim 13 wherein the cover strip includes a hook portion that is engaged with the top of the French cleat.

* * * * *